US012782978B2

(12) United States Patent
Levey

(10) Patent No.: US 12,782,978 B2
(45) Date of Patent: Nov. 3, 2026

(54) FLUID DISPENSING SYSTEM

(71) Applicant: Starbucks Corporation, Seattle, WA (US)

(72) Inventor: Jonathan Levey, Geneseo, NY (US)

(73) Assignee: Starbucks Corporation, Seattle, WA (US)

(*) Notice: Subject to any disclaimer, the term of this patent is extended or adjusted under 35 U.S.C. 154(b) by 299 days.

(21) Appl. No.: 18/522,994

(22) Filed: Nov. 29, 2023

(65) Prior Publication Data

US 2024/0184314 A1 Jun. 6, 2024

Related U.S. Application Data

(60) Provisional application No. 63/385,742, filed on Dec. 1, 2022.

(51) Int. Cl.

*G05D 7/06* (2006.01)
*A23F 3/40* (2006.01)
*A23F 5/46* (2006.01)
*A47J 31/46* (2006.01)
*F04B 49/06* (2006.01)

(52) U.S. Cl.

CPC ........... *G05D 7/0676* (2013.01); *A23F 3/405* (2013.01); *A23F 5/465* (2013.01); *A47J 31/468* (2018.08)

(58) Field of Classification Search

CPC ....... G05D 7/0676; A23F 3/405; A23F 5/465; A47J 31/468; F04B 13/00; F04B 15/02; F04B 17/03; F04B 49/06; F04B 2203/0201; F04B 49/20; F04B 2203/0209; F04B 2203/0401; F04B 2205/05; F04B 2205/09; F04B 49/065

USPC ........................................................ 700/282

See application file for complete search history.

(56) References Cited

U.S. PATENT DOCUMENTS

| | | | | |
|---|---|---|---|---|
| 11,064,846 B2 | 7/2021 | Yang et al. | | |
| 2009/0242584 A1 | 10/2009 | Palmer | | |
| 2011/0110794 A1* | 5/2011 | Mayleben | F04D 15/0218 | 417/313 |
| 2012/0196374 A1 | 8/2012 | Haga | | |
| 2013/0240570 A1 | 9/2013 | Johansson et al. | | |
| 2016/0177958 A1* | 6/2016 | Schneider | F04D 15/0011 | 415/36 |
| 2019/0234398 A1 | 8/2019 | Endo | | |

(Continued)

FOREIGN PATENT DOCUMENTS

| | | |
|---|---|---|
| CN | 114178072 A | 3/2022 |
| JP | 2005/291998 A | 10/2005 |
| JP | 2010/151709 A | 7/2010 |

*Primary Examiner* — Michael J Brown

(74) *Attorney, Agent, or Firm* — Knobbe, Martens, Olson & Bear, LLP

(57) ABSTRACT

Disclosed herein are methods of pumping fluids and fluid pump devices and systems. The systems described herein include an adjustable pump configured to expel fluid at a plurality of flow rates. The systems include at least one current measurement device communicatively coupled to the pump and configured to measure an electrical current applied to the pump. The systems include a controller communicatively coupled to the pump and the at least one current measurement device. The controller is configured to adjust an operating parameter of the pump based at least in part on a measurement of the electrical current measured by the at least one current measurement device.

11 Claims, 5 Drawing Sheets

(56) References Cited

U.S. PATENT DOCUMENTS

| | | | | |
|---|---|---|---|---|
| 2021/0301801 | A1 | 9/2021 | Janecek et al. | |
| 2022/0154720 | A1* | 5/2022 | Bovill | F04D 15/0218 |

* cited by examiner

FLUID DISPENSING SYSTEM

INCORPORATION BY REFERENCE TO ANY PRIORITY APPLICATIONS

This application claims priority to U.S. Provisional Patent Application No. 63/385,742, filed Dec. 1, 2022, the entirety of which is incorporated herein by reference.

FIELD

Fluid pumps and systems. More specifically, adjustable fluid pumps and systems for beverages.

BACKGROUND

Customized beverages can be created by adding different quantities of sauces, syrups, and flavors to a base beverage, such as coffee or tea. Sauces, syrups and flavors are currently dispensed using disposable mechanical pumps as shown in FIG. 1 or reusable mechanical pumps as shown in FIG. 2. The sauce, syrup or flavor is filled in the pump containers 2 and 4. A barista pumps the sauce, syrup or flavor by manually pushing down on the pump levers 1 and 3 to dispense fixed volumes of sauces, syrups and flavors thru the pump nozzles 5 and 6.

Various embodiments are depicted in the accompanying drawings for illustrative purposes and should in no way be interpreted as limiting the scope of the embodiments. Furthermore, various features of different disclosed embodiments can be combined to form additional embodiments, which are part of this disclosure.

DETAILED DESCRIPTION

Coffee or tea beverages usually have a base of coffee or tea extracts mixed with dairy enhanced by a variety of textures, tastes, flavors, colors and/or aromas. One can create different textures, tastes, flavors, colors and aromas by adding different quantities of ingredients or modifiers (e.g., sauces, syrups and flavors) or adding the same ingredients or modifiers in different sequences. For example, to create a menu offering of 70 handcrafted coffee beverages, there may be 10 flavors, 2 syrups and 7 sauces. Flavors are usually alcohol based. Examples of some flavors are vanilla, toffee nut, and hazelnut. Sauces are usually multiple ingredients blended together in a water solution. Examples of some sauces are white chocolate mocha, chai and mocha. Syrups are usually liquid forms of sugar or sugar-free substitutes.

Figure 1:
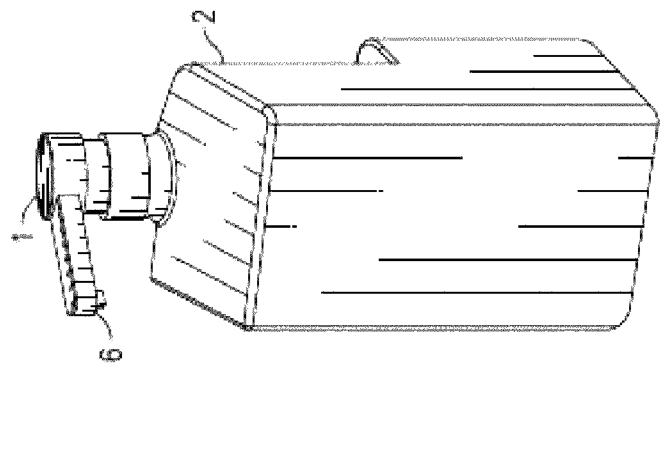
FIG. 1 (Prior Art)
FIGS. 1 and 2 illustrate prior art pump containers.
Figure 2:
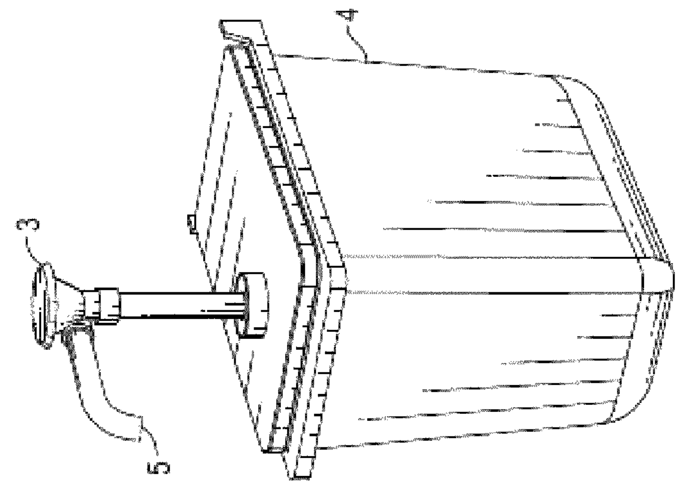
FIG. 2 (Prior Art)

Currently, flavors, sauces, and syrups are dispensed using disposable mechanical pumps as shown in FIG. 1 or reusable mechanical pumps as shown in FIG. 2. The syrup, sauce or flavor is filled in the pump containers 2 and 4. The barista pumps the flavor, sauce or syrup by manually pushing down on the pump levers 1 and 2 to dispense fixed volumes of flavors, sauces and syrups thru the pump nozzles 5 and 6.

An aspect of the present disclosure is the recognition that sauces and syrups sometimes include natural ingredients that are agricultural commodities/crops. Often agricultural crops yield different characteristics from year to year, or even from production lot to lot. Many agricultural crops have differences in the source (for example sugar; beat, cane, etc.) and differences in the processing that contribute to inconsistency in final raw material. Inconsistencies in raw materials can impact fluid formulas via specific gravity, viscosity, etc.

The changing characteristics described above can make it difficult to accurately dose/fill/dispense these fluids in an open system. An open system that includes a predetermined pump speed (power, current) and duration that can be provided to yield a desired dose. But such systems may not include real time feedback to system. This methodology is adequate when a used medium is known, however other systems may be desired to address changing medium characteristics.

Various sauces, syrups, and other liquids used to build beverages can have a variety of viscosities. Viscosity can vary between different types of fluids used as ingredients to build a single beverage. For example, syrup can have a different viscosity from milk. Further, viscosity of a single type of liquid can vary within a container. For example, a syrup may have a greater viscosity at a bottom of a surrounding container than at the top of the container due to settling of the fluid. A syrup may also have a greater viscosity as it sets over time. A recipe for a syrup may also change over time resulting in changes in viscosity or other characteristics of the medium. In automated systems, this difference in viscosity can cause a pump to expel inconsistent volumes of fluid over time as the energy required to expel a viscous fluid from a pump is greater than the energy required to expel a less viscous fluid under uniform conditions. In order to dispense a consistent volume of liquid for a beverage, a pump system according to the present disclosure can use various systems and methods to compensate for variations in viscosity over time and among fluids.

As such, it may be desired to expel fluid into a container at a consistent volume flow rate to provide a consistent volume of fluid into the beverage over a given time. Additionally, in beverage applications where the fluid is being distributed in discrete portions, it can be advantageous to maintain a consistent volume flow rate among distributions, to ensure each portion or dose has a consistent amount of fluid. Manual systems such as the pumps shown in FIGS. 1-2 use a volume-fill mechanism, which can provide substantially uniform fluid output when expelling discrete portions. But, automated systems having non-volume-fill mechanisms can benefit from additional configurations disclosed herein to maintain substantially consistent fluid volume output.

In accordance with several embodiments, the systems described herein advantageously automate the dispensing of ingredients, modifiers or enhancers (e.g., sauces, syrups, flavors, tastes, colors, reductions). Various devices, systems, and methods are provided for pumping fluid or fluids having a plurality of viscosities (or changes in viscosities over time) at a substantially uniform volume flow rate. The systems and methods described herein provide a pump system that is configured to adjust an output volume flow rate to compensate for increased and decreased viscosities in a fluid pumped therethrough. The system is configured to use data and correlations determined from previous pumping to maintain a substantially uniform volume flow rate. In some examples, the data and correlations can include relating one or more of electrical current, pressure data, and air displacement, with flow rate data.

As described above, in some examples, the system utilizes continuous pumping, and in some examples, the system utilizes discrete pumping. In systems utilizing continuous pumping, the system uses pumping data from an earlier point in time. For example, the system can use electrical current, pressure (pump inlet or outlet, and/or air displacement (from the pump) from a determined time period (e.g., 2s, 5s, 10s, 30s, etc.) to determine current pumping parameters. In systems where the pump utilizes discrete pumping, the system uses data from previous pump sequences to determine pumping parameters. For example, the system can use electrical current, pressure (pump inlet or outlet, and/or air displacement (from the pump) from one or more previous pumping sequences to estimate an appropriate pump speed and/or duration to expel a desired volume of fluid. In example systems utilizing continuous pumping, this determination of pumping parameters provides a means for the system to substantially maintain a desired output volume flow rate. In the example utilizing discrete pumping, this configuration provides a means for subsequent discrete pump sequences to expel fluid at a desired volume flow rate, such that the pump expels substantially uniform volumes of fluid per pumping sequence. In some examples, pumping data can be stored and correlated with certain conditions to inform future pumping sequences. For example, data reflecting a particular current load characteristics (e.g., rate of change) can be correlated with a certain corresponding working fluid viscosity. As such, the data can be referenced and used later to provide desired pumping characteristics.

Figure 3:
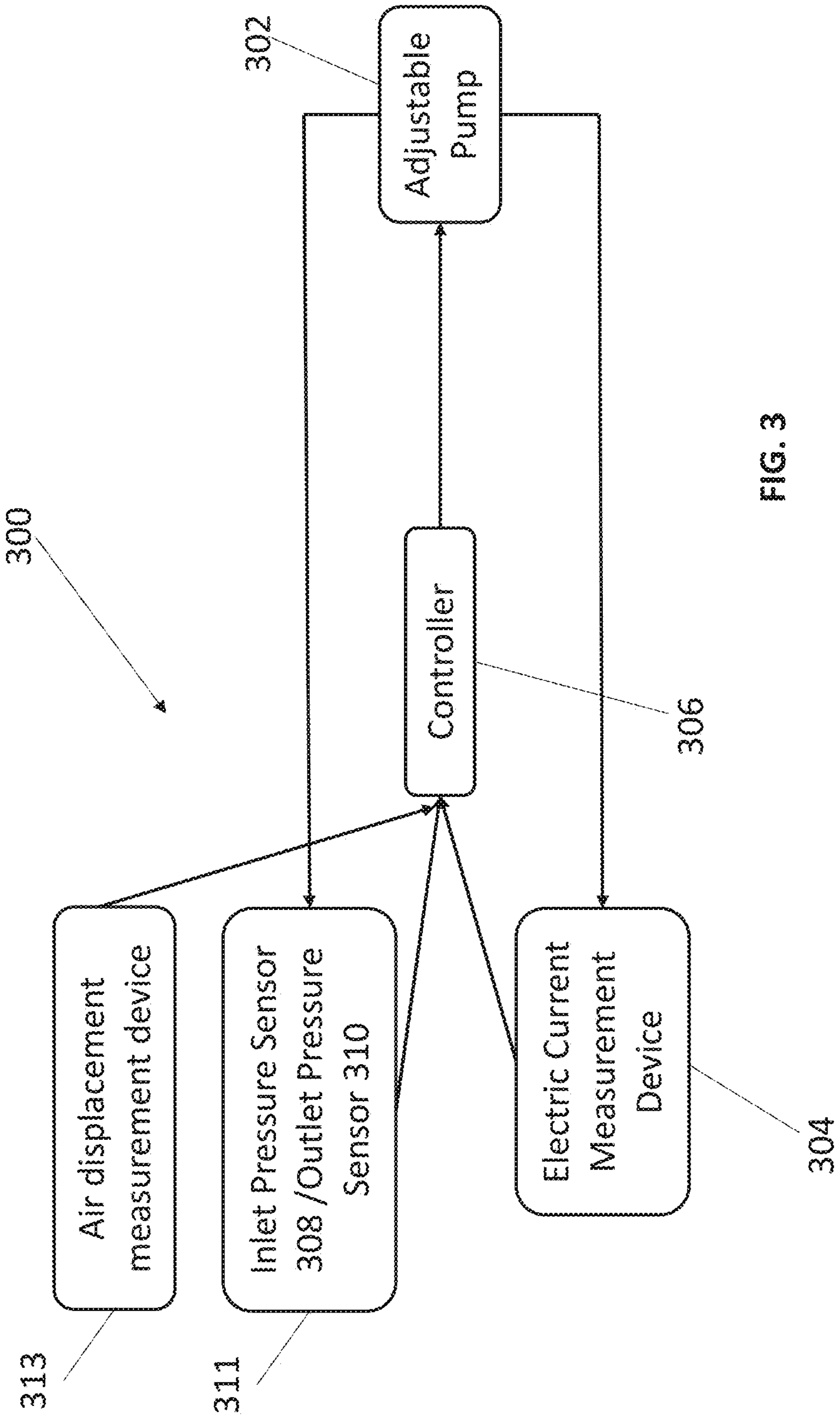
FIG. 3 is a diagram illustrating an example pump system.

FIG. 3 shows a system 300 for dispensing fluid that includes an adjustable pump 302, a current measurement device 304 communicatively coupled to the pump 300, a controller 306 communicatively coupled to the pump 302 and the current measurement device 304, a pressure measurement device 311 which can include an inlet pressure sensor 308, and/or outlet pressure sensor 310, and an air displacement measurement device 313, which can measure the air displacement from the adjustable pump 302.

The pump 302 is provided to transfer fluid from a fluid reservoir to a container such as a cup or a mixing apparatus. In the example shown in FIG. 3 the pump 302 includes an inlet, an outlet, and an inner surface defining a channel between the inlet and the outlet. The inlet of the pump 302 is in fluidic communication with the outlet of the pump 302, such that fluid that enters the inlet of the pump 302 can be expelled through the outlet of the pump 302. The pump 302 also includes an electrical motor. The motor is configured to drive the pump 302 at various speeds to vary flow rates through pump. The motor speed depends on the amount of electrical current supplied to the motor. For example, the pump 302 can increase flow rate through the pump as current supplied to the motor increases, and the pump 302 can decrease flow rate through the pump 302 as the current supplied to the motor decreases. Alternatively, or additionally, in some examples, the pump 302 can increase the output flow by increasing the amount of time the motor operates. The pump 302 can be configured to operate in discrete sequences such that the pump 302 is able to expel a desired discrete volume of fluid therethrough depending upon the number of sequences. But in some examples, the pump is a continuous pump such as an impeller pump that can be operated at a specific speed and/or duration to control flow rate. In other examples, the pump can be any kind of pump capable of expelling viscous liquid therethrough. The pump 302 includes an electrical input configured to receive electrical current. In the example shown in FIG. 3, the electrical input is an electrical lead wire. But in other examples, the electrical input can be any mechanism capable of receiving electric current and capable of transferring the electric current at a current corresponding to the current received. For example, the electrical input, can transfer the current received at a same current or at a current with a ratio corresponding to the input current.

As described above, in some examples, the pump is a continuous flow pump, but in other examples the pump is a reciprocating pump such as a diaphragm pump or a peristaltic pump. The pump 302 can be driven using an electric motor. In examples including a reciprocating pump, the pump can be motor driven such that the motor sequentially depresses and releases the pump to expel fluid periodically. For example, a motor used to depress the pump can include a camming feature that extends from a rotating of the motor shaft perpendicular to a central axis of the shaft such that as the motor rotates, the camming feature depresses the pump at least once per full rotation of the motor.

In some examples, the system 300 further includes a fluid reservoir. In some examples, the inlet of the pump 302 is fluidically coupled to the fluid reservoir. The fluid reservoir can be provided to hold a desired fluid to be drawn into the inlet of the pump 302 and expelled through the pump 302. In some examples, the fluid reservoir is a plastic container, or any other container suitable to hold perishable edible liquids. The fluid reservoir can be fluidically sealed with the inlet of the pump 302, such that the pump 302 can form a vacuum to extract fluid from the fluid reservoir. Output from the pump can be delivered to a nozzle for delivering the contents of the pump to a beverage container.

The current measurement device 304 is provided to determine an electrical current applied to the pump 302 at a given time. The current measurement device 304 receives current input such that the current provided to the pump 302 is the substantially the same as current that is provided to the current measurement device 304. As such, the current measurement device 304 provides a mechanism for the system 300 to monitor current, which can be used to determine the power and duration expended to move the fluid through the pump 302. Further this power determination can be correlated or used in conjunction with additional data such as data from one or more of the pressure sensors 308, 310 (discussed in further detail below). The current measurement device 304 is configured to measure the current and transmit the current measurement to the controller 306 (described in further detail below) in real time. As such, as the current provided to the pump 302 changes, the current measurement device 304 transmits the changes in current to the controller 306 such that the controller 306 can perform various functions based on the changes in current. For example, the controller 306 can send a control signal to the pump 302, correlate the current measurement with predetermined data such as fluid working viscosities, correlate the current measurement with other measured parameters such as volume flow rate, air displacement, inlet pressure, and outlet pressure. Although the current measurement device 304 is configured to measure the current and transmit the current measurement to the controller 306 in real time, in some examples, a current measurement device can be used that transmits measurements to various receivers at various time intervals. For example, the current measurement device 304 can transmit the current measurement to a remote server to correlate with corresponding data or use the current measurement as training data for machine learning.

In the example of FIG. 3, the current measurement device 304 is a current probe integrated into the controller 306. The current probe is adjacent the electrical input of the pump 302 such that the current probe receives current measurements substantially similar to the current entering the current input. Although the current measurement device 304 in the example shown in FIG. 3 is a current probe, in some examples, the current measurement device is any device capable of measuring a current at a given location. Although in the example, shown in FIG. 3, the current measurement device 304 is integrated with the controller 306, in some examples the current measurement device 304 is located remotely from the controller 306 and communicates electronically and/or wirelessly with the controller 306.

As described above, in some examples the system 300 as shown in FIG. 3, includes a pressure measurement device. In some examples, the pressure measurement device 311 can be used in conjunction with the current measurement device 304 to provide additional accuracy to system measurements such as fluid flow rate and fluid viscosity. In some examples, the pressure measurement device 311 can take measurements used to provide data to calculate additional sets of information. The pressure measurement device 311 is a device that determines a pressure at an inlet to and/or outlet from the pump 302.

The pressure entering or expelled from the pump 302 can vary as the pump 302 receives power having various levels of current. The pressure of fluid expelled from the pump 302 also varies as properties of the fluid being expelled from the pump 302 differ. For example, a highly viscous fluid may be expelled using a certain amount of energy. The highly viscous fluid may be expelled at a different pressure than a fluid of a lower viscosity using the same amount of energy. The pressure measurement device 311 can measure this pressure at a given time. The pressure measurement device can further transmit the fluid pressure to the controller 306. In the example shown in FIG. 3, the pressure measurement device 311 is a first pressure sensor 308 (inlet pressure sensor) and/or a second pressure sensor 310 (outlet pressure sensor). In the example shown in FIG. 3 the inlet pressure sensor is disposed adjacent the inlet of the pump 302 such that that the inlet pressure sensor 308 can measure a fluid pressure at the inlet of the pump 302. The outlet pressure sensor 310 is disposed adjacent the outlet of the pump 302 such that the outlet pressure sensor 310 can measure a fluid pressure at the outlet of the pump 302. As such, in certain embodiments, the controller 306 can determine the change of pressure of fluid through the pump 302 based at least in part on a difference between the inlet pressure and the outlet pressure of the pump 302.

The controller 306 is provided to at least in part to adjust a pump operating parameter (e.g., pump operating speed and/or duration) so as to control flow rate through the pump 302. In some examples, the controller 306 can determine a fluid flow rate of fluid expelled from the pump 302 and determine the viscosity of the fluid based on the measured current and/or a pressure measurement. The controller 306 is also provided to control the pump operating speed and/or pump duration 302 at a given time to control the fluid flow rate of the fluid that is expelled from the pump 302. For example, based on the measured electrical current and/or pressure, the controller 306 can determine that a working fluid in the pump 302 has an increased viscosity. The controller 306 can determine to increase the pump operating speed and/or duration to maintain a desired volume delivered from the pump 302. In some examples, the controller 306 can determine working fluid characteristics based on correlation of current data and/or pressure data to a table that includes working fluid attributes. In some examples, the controller 306 can send a signal to the pump 302 to increase the amount of power provided to the pump 302 in response to the electrical current and/or pressure measurement signals. The controller 306 can then maintain the amount of power steadily until the controller 306 receives an indication from the current and/or pressure measurement device which measures that the fluid is being pumped at a second flow rate different from the first flow rate. The controller 306 can then send a signal to increase the amount of power provided to the pump 302 until the flow rate is at a desired flow rate. The controller 306 can determine the amount of power provided and determine to use that amount of power for subsequent pumping.

The controller 306 can continue to implement at least one of the sequences described above to cause fluid to be pumped at a substantially uniform volume flow rate. In some examples as described above, the pump 302 distributes fluid in discrete sequences such as in a pump operating for predetermined time intervals. As such, the controller 306 can determine the fluid flow rate and energy output per pump sequence and adjust the energy supplied to the pump 302 such that subsequent sequences are provided with satisfactory power to maintain a fluid flow rate at a given viscosity. The parameters provided can be used to preset future sequences of this or different systems in the future. For example, certain parameters can be associated with a certain fluid type as described above. As such, the system 300 can be adjusted to desired parameters when current input correlates with an associated fluid type that is to be pumped therethrough. For example, in example systems including dispensers having a sensing or reading device that can identify the ingredient being loaded into the modular dispenser, the controller 306 can determine a desired current to supply to the pump 302 based on predetermined data, or data received from the flow sensors and/or the current measurement device 304. As such, the system can adapt to preemptively accommodate the fluid to be expelled from the pump 302.

Figure 4:
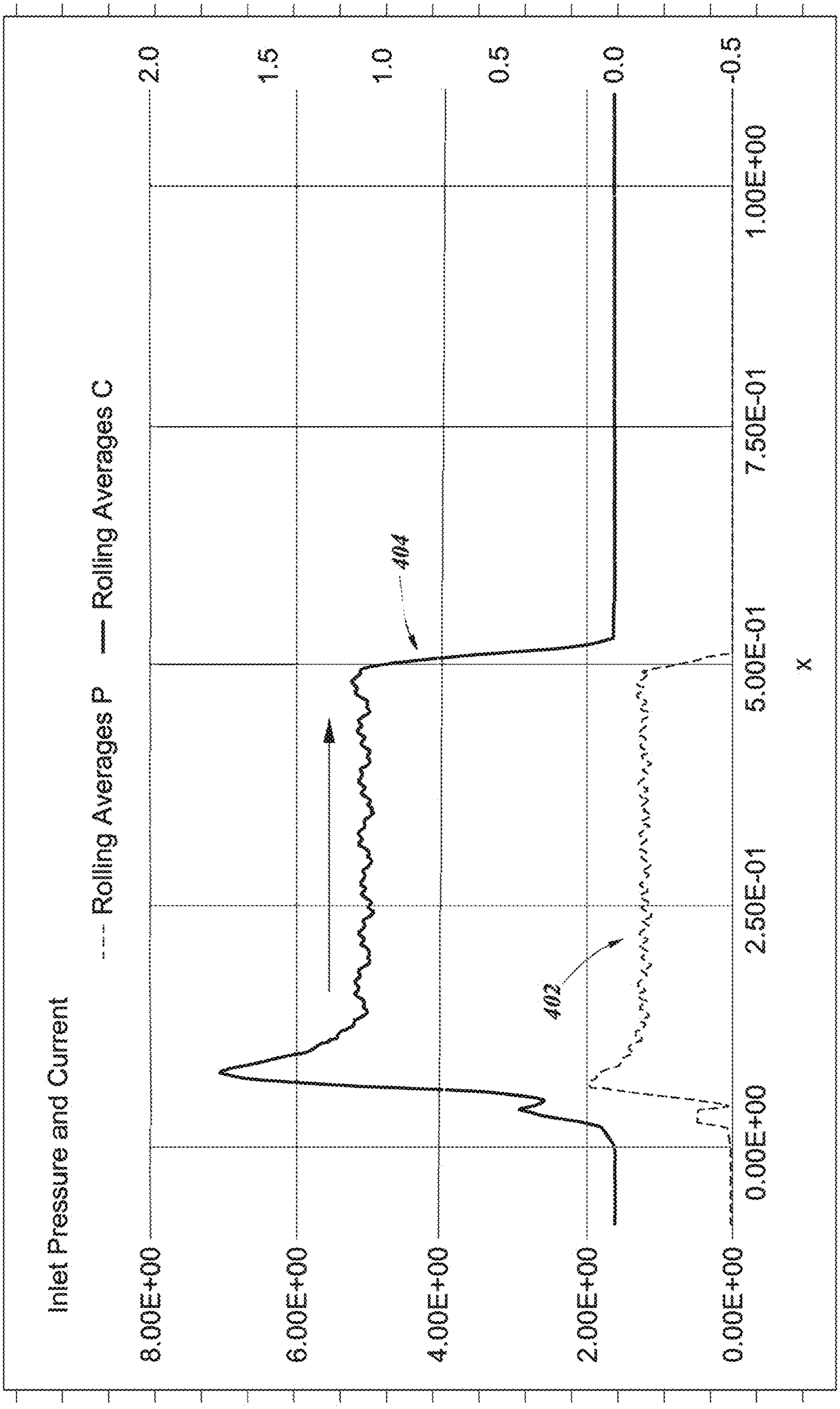
FIG. 4 is a chart showing an example pump inlet pressure and current supplied over time for pumping a first fluid.
Figure 5:
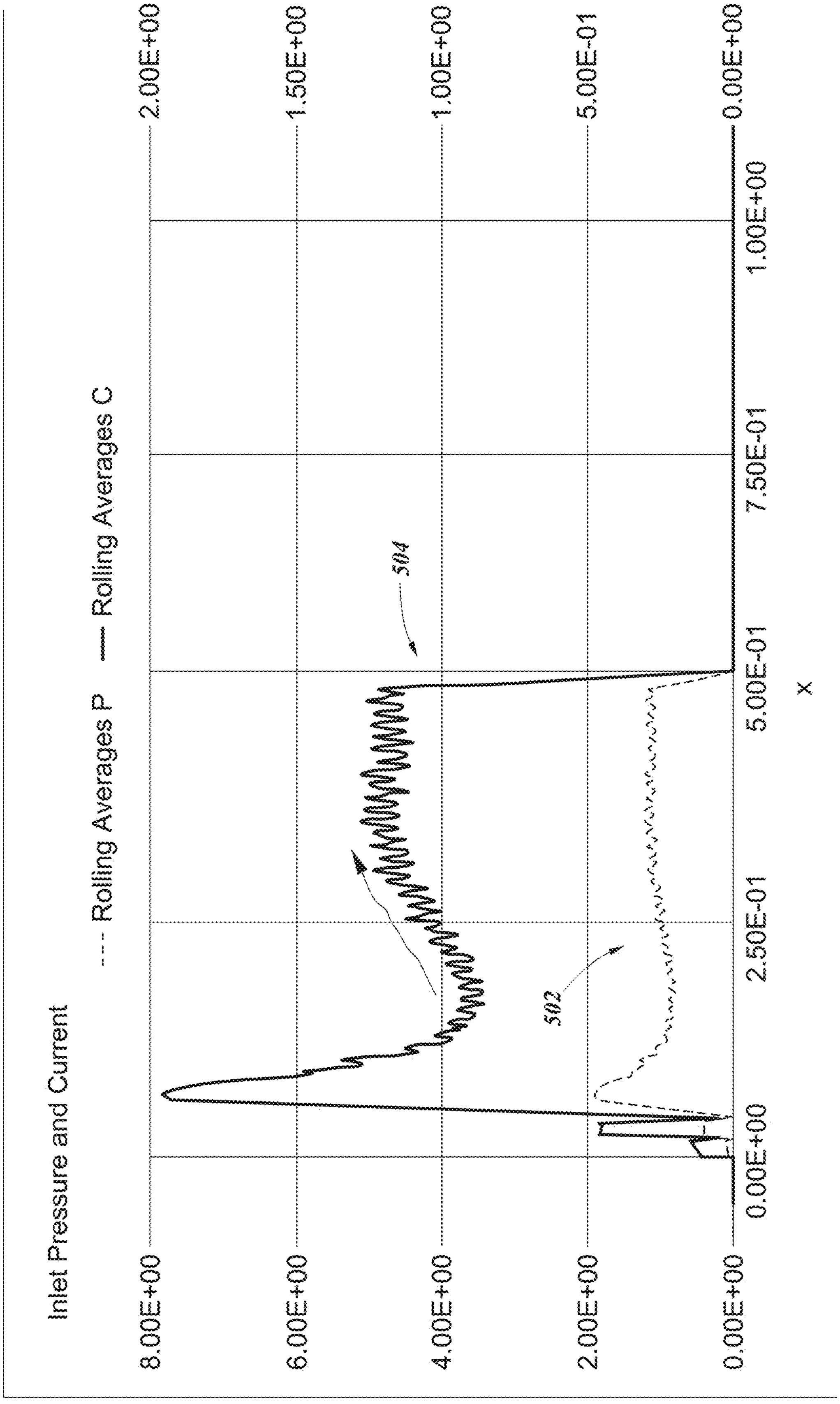
FIG. 5 is a chart showing an example pump inlet pressure and current supplied over time for pumping a first fluid and a second fluid.

FIGS. 4 and 5 are example charts showing pump inlet pressure for a pump that is actively pumping fluid. FIGS. 4 and 5 also show current supplied to the pump at a specific operating speed. FIG. 4 is an example chart showing a pump inlet pressure 402 and current 404 supplied over time for pumping a first fluid. FIG. 4 shows a substantially consistent inlet pressure 402 and substantially constant current 404 applied to the pump. FIG. 4 further shows a spike in current 404 that substantially correlates with a spike in measured pressure 402. The spike correlates a change in fluid and resulting motor ramp up. FIG. 5 is an example chart showing a pump inlet pressure 502 and current 504 supplied over time where there is a change in fluid from a first fluid to a second fluid. FIG. 5 further shows a spike in current 504 that substantially correlates with a spike in measured pressure 502. The spike correlates a change in fluid, and the resulting motor ramp up indicates more viscous fluid as compared to the fluid used in FIG. 4. In some examples, a spike in current 504 can result from various fluid or ingredient characteristics such as in examples using non-Newtonian fluids.

The inlet pressure shown in FIG. 5 follows rising and falling trends. More specifically, the FIG. 5 illustrates rising and falling trends that correlate to fluid changes from a less viscous fluid to a more viscous fluid. As such, FIG. 5 shows that the current 504 supplied to the pump increases as inlet pressure 502 increases with the change of fluid. The illustrated correlation between fluid pressure 502 in a pump and current 504 supplied to the pump show a mechanism to provide flow rate consistency based on current measurement and can be used to correlate current 504 and/or fluid pressure 502 with viscosity. Such information can be used generate formulas or look-up tables which can be used by the controller to determine viscosity and/or to adjust pump operating parameters (e.g., pump speed and/or duration) to deliver a substantially constant amount of fluid even though the fluid viscosity has changed.

Figure 6:
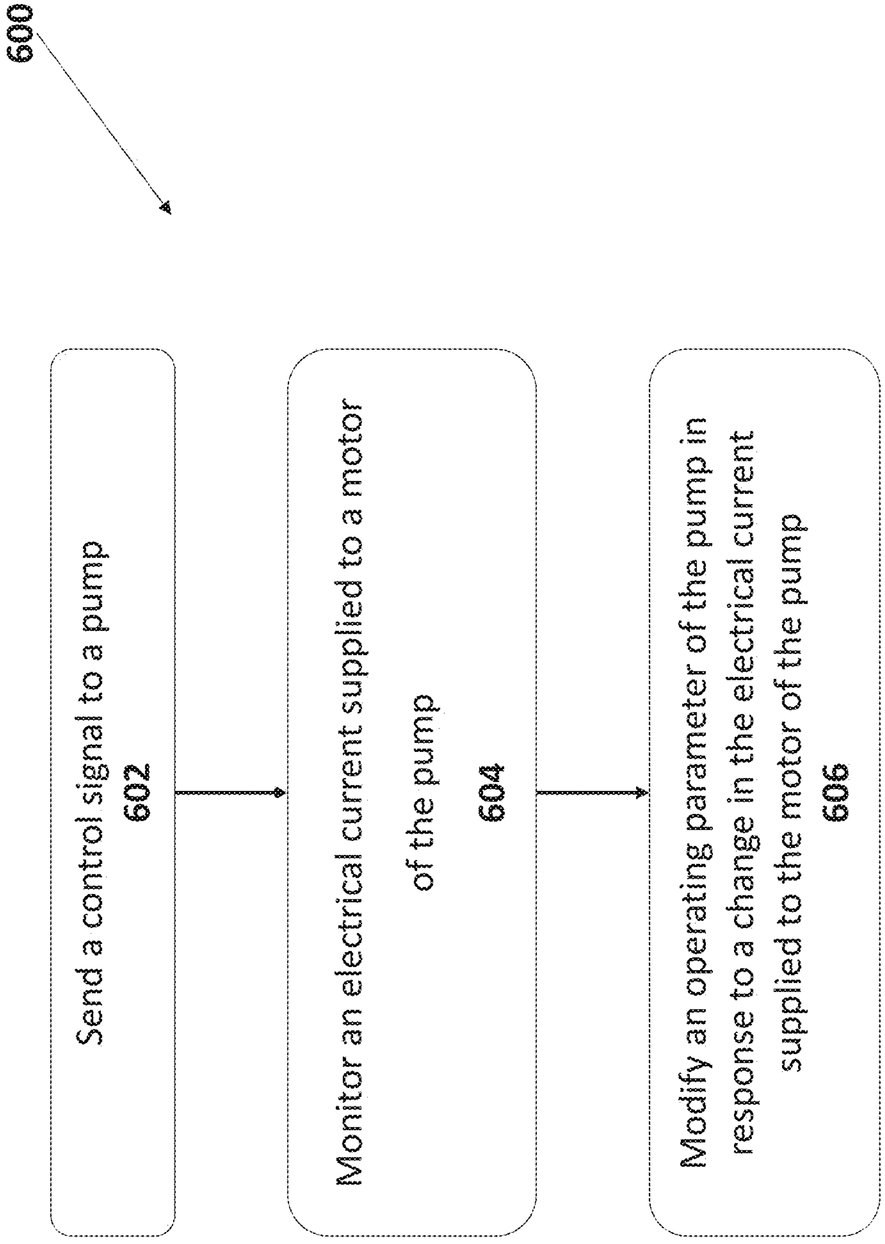
FIG. 6 is a flow chart of an example process for pumping fluid with volume rate flow rate stabilization.

In the example shown in FIG. 6 an example process 600 for pumping fluid with volume flow rate stabilization is shown.

At 602 The controller 306 sends a control signal to a pump 302 to expel fluid at a first flow rate at least in part by causing the pump 302 to receive a first electrical load.

The first electrical load is a predetermined electrical load estimated to expel an intended fluid from the pump 302 at a desired volume flow rate. For example, the electrical load can be determined to pump syrup at a flow rate sufficient to fill one fluid ounce per second. But in other examples, the controller 306 sends a control signal to a power source to cause the pump to expel fluid from the outlet at a non-fluid specific flow rate that can be adjusted over time.

At 604, the controller 306 monitors an electrical load of a motor of the pump 304. The controller 306 receives data from the electrical current measuring device 304, which indicates the flow of current to the pump 302 as described above. The electrical load can be measured in real time to indicate changes in current supplied to the pump 302.

At 606 the controller 306 sends a control signal to the pump 302 to expel fluid at the first flow rate at least in part by causing the pump 302 to receive a second electrical load different from the first electrical load. The second electrical load is an electrical load estimated to expel an intended fluid from the pump 302 at a volume flow rate substantially the same as the first volume flow rate. For example, the second electrical load can be determined to pump syrup at a flow rate sufficient to fill one fluid ounce per second based on a working fluid that has different fluid properties than the working fluid that was pumped using the first electrical load.

As described above, in some examples the system 300 can utilize at least one sensor such as one of the fluid flow rate measurement device 311 and air displacement measurement device 313 to provide additional measurement accuracy and/or capability. In some examples, the controller 306 determines a pump flow rate based at least in part on the pump input pressure measurement and the pump output pressure measurement. As described above, the controller 306 can calculate the flow rate of fluid expelled through the pump 302 based on the difference between inlet pressure and outlet pressure. The controller 306 determines that a dynamic flow rate of the fluid expelled from the pump is different from the first flow rate. In some examples, the controller 306 can also determine the pump flow rate based at least in part on displacement of air at the inlet or outlet of the pump 302. In some examples, the controller 306 determines viscosity of working fluid in the pump 302 based on a combination of the fluid flow rate and the measured electrical load as described above. The controller 306 can modify the determinations of input data and input parameters to the pump 302 based on viscosity data. As such, the electrical load and/or run time applied to the pump 302 can be adjusted to compensate for a change in viscosity in the fluid.

In some examples, the controller 306 receives updated electrical input data comprising an electrical input measurement for the second electrical load. The controller 306 can then determine to use the second electrical load for subsequent pumping sequences to cause the fluid to be expelled at the first fluid flow rate. In some examples, the controller 306 can cause the pump 302 to stop expelling fluid and end a first pumping cycle. The controller 306 can then cause the pump 302 to re-start expelling fluid in a second pumping cycle using previously measured parameters such as the second electrical load. In some examples, the system 300 can store and/or transmit data to a processor which can correlate or use this data in future pumping cycles to compensate for determined fluids having determined viscosities. In some examples, the processor is a local processor, and in other examples, the processor is a remote processor.

Although certain embodiments have been described herein in connection with flavors, sauces, or syrups for coffee or tea beverages, the systems described herein can be used for any type of ingredient or food product. For example, in some embodiments, the systems herein can be used to deliver fluid or solid ingredients, such as ketchup, mustard, barbecue sauce, cheese sauce, relish, onions, etc. In some embodiments, the systems herein can be used to produce other types of beverages such as sodas, juices, smoothies, milkshakes, etc.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently.

The various illustrative logical blocks, modular dispensers, routines, and algorithm steps described in connection with the embodiments disclosed herein can be implemented as electronic hardware, computer software, or combinations of both. To clearly illustrate this interchangeability of hardware and software, various illustrative components, blocks, modular dispensers, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks, devices, and systems in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

While the above detailed description has shown, described, and pointed out novel features as applied to various embodiments, it can be understood that various omissions, substitutions, and changes in the form and details of the devices or algorithms illustrated can be made without departing from the spirit of the disclosure. For example, although different numbers have been used for similar components or features in different figures (e.g., different numbers have been used for the dispenser modules, displays, controllers, etc.), the structural and functional features described in connection with one figure, embodiment, or numbered element may be incorporated into the different-numbered components or features, and vice-versa. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

The invention claimed is:

1. A beverage system for dispensing fluid ingredient, comprising:

an adjustable pump configured to expel fluid ingredient at a plurality of flow rates;

at least one current measurement device communicatively coupled to the pump and configured to measure an electrical current applied to the pump; and a controller communicatively coupled to the pump and the at least one current measurement device, wherein the controller is configured to adjust an operating parameter of the adjustable pump to control a flow rate of the fluid ingredient based at least in part on a change in the electrical current measured by the at least one current measurement device in order to maintain the flow rate of the fluid ingredient at a constant flow rate.

2. The beverage system of claim 1, wherein the operating parameter is an operating speed of the pump.

3. The beverage system of claim 1, wherein the operating parameter is a duration of pump operation.

4. The beverage system of claim 1, wherein the operating parameter is a duration of pump operation and operating speed of the pump.

5. The beverage system of claim 1, further comprising at least one pressure measurement device communicatively coupled to the controller, wherein the controller is configured to adjust an operating parameter of the pump based at least in part on a pressure measured by the at least one pressure measurement device.

6. The beverage system of claim 5, wherein the at least one pressure measurement device comprises at least one of an inlet pressure sensor and an outlet pressure sensor.

7. The beverage system of claim 1, further comprising, at least one air displacement measurement device communicatively coupled to the controller, wherein the controller is configured to adjust an operating parameter of the pump based at least in part on air displacement measured by the at least one air displacement measurement device.

8. The beverage system of claim 1, wherein the controller is configured to cause the pump to expel fluid over a period of time at a substantially uniform volume flow rate based at least in part on the current measurement.

9. The beverage system of claim 1, wherein the controller is configured to dynamically adjust an electrical load applied to the pump during operation of the pump.

10. A method of dispensing a fluid ingredient from a beverage system, the method comprising:

sending, via a controller, a control signal to an adjustable pump to cause the pump to receive an electrical load and expel the fluid ingredient at a flow rate;

monitoring an electrical current supplied to a motor of the adjustable pump to determine the electrical load supplied to the motor;

determining, via the controller, a viscosity of the fluid ingredient based at least in part on the electrical load supplied to the motor;

modifying, via the controller an operating parameter of the pump in order to modify the electrical load based on the determined viscosity to maintain the flow rate of the fluid ingredient at a constant flow rate.

11. The method of claim 10, wherein determining the viscosity comprises correlating the electrical current of the motor to at least one fluid viscosity.

* * * * *